United States Patent [19]
Wicks

[11] Patent Number: 5,977,196
[45] Date of Patent: Nov. 2, 1999

[54] SEALER AND INFLATOR COMPOSITION

[75] Inventor: Robert T. Wicks, Richton Park, Ill.

[73] Assignee: Gold Eagle Co., Chicago, Ill.

[21] Appl. No.: 09/212,046

[22] Filed: Dec. 15, 1998

[51] Int. Cl.⁶ .............. C08J 9/30; B29C 73/16; B29C 73/22
[52] U.S. Cl. ............ 521/78; 152/504; 152/505; 152/507; 521/79; 521/98; 523/156; 524/356; 524/366
[58] Field of Search ................... 521/78, 79, 98; 524/356, 366; 523/156; 152/347

[56] References Cited

U.S. PATENT DOCUMENTS 4,501,825  2/1985  Magyar et al. .
5,124,395  6/1992  Abramowski et al. .
5,618,912  4/1997  Fang .
5,705,604  1/1998  Fang .

*Primary Examiner*—Morton Foelak
*Attorney, Agent, or Firm*—Gerstman, Ellis & McMillin, Ltd.

[57] ABSTRACT

A sealer and inflator composition, particularly for inflating tires. The composition comprises: a sealant; a non-flammable propellant/inflator having an ozone depletion potential of zero; and a vapor pressure depressant which may be either hydrocarbon diethers of 3 to 6 carbon atoms, hydroxyketones of 3 to 6 carbon atoms, or mixtures thereof.

16 Claims, No Drawings

SEALER AND INFLATOR COMPOSITION

BACKGROUND OF THE INVENTION

In Abramowski et al. U.S. Pat. No. 5,124,395, a non-ozone depleaing, non-flammable tire sealer and inflator composition is disclosed using as a propellant/inflator 1,1,1,2-tetrafluoroethane, sometimes known by the tradename of HFC 134a. HFC 134a was developed as a replacement product for Freon-type products in formulations such as tire inflator formulations stored in an aerosol can with a valve, where a tire can be inflated by attaching the valve of the can to the valve of a tire, and allowing the pressure in the can to inflate the tire, with the contents sealing the leak in the tire.

Particularly, HFC 134a was developed as a replacement product for chlorofluorocarbon propellant/inflators. It can be seen that HFC 134a is a chlorine-free fluorocarbon. Chlorofluorocarbons such as CFC-12 (dichlorodifluoromethane) are undesirable for use because of their capability of attacking the ozone layer of the atmosphere.

Other propellants for tire inflator formulations have been considered such as butane and propane. However, these propellants are flammable and thus can be dangerous when used in tire inflator formulations. Thus, HFC 134a has been widely considered as a potential substitute for these other propellants in a variety of uses including tire inflator formulations, serving as an aerosol propellant and an inflator in desired formulations which do not harm the ozone layer, and which are nonflammable.

Other prior art tire sealant and inflator systems are disclosed in Magyar et al. U.S. Pat. No. 4,501,825, which discloses a tire sealant and inflator system which comprises from 20 to 40% of a resin, 20 to 40% of a latex sealant, and 2 to 20% of an alkylene glycol, mixed with a propellant comprising 60% dichlorodifluoromethane and 40% dichlorotetrafluoroethane.

Fang U.S. Pat. Nos. 5,618,912 and 5,705,604 show various tire sealer and inflator compositions using a non-flammable propellant/inflator having an ozone depletion potential of zero (i.e. HFC 134a) and also incorporating a petroleum residual resin sealant, among other ingredients.

As one technical problem, the vapor pressure of HFC 134a at 130 degrees F. is 198–199 psig. This is well above 180 psig limit criteria for aerosol cans of 2Q type under DOT regulations. While the above patents have listed various vapor pressure reducing additives which may be provided to the formulation, the specific additives taught in the prior art are less effective than desired.

In accordance with this invention, vapor pressure reducing additives are provided to sealer and inflator compositions which have increased effectiveness, so that lesser amounts of the additives are required, resulting in a significant cost reduction to formulations making use of the invention of this application.

DESCRIPTION OF THE INVENTION

By this invention, a sealer and inflator composition is provided which comprises: a sealant; a non-flammable propellant/inflator having an ozone depletion potential of 0; and a vapor pressure depressant selected from the group consisting of hydrocarbon diethers of 3–6 carbon atoms and hydroxyketones of 3 to 6 carbon atoms. Mixtures of various individual members of the above group may be used to provide a multiple component vapor pressure depressant if desired, and other additives may be added to the vapor pressure depressant as well. By this invention, these new vapor pressure depressants may be part of a sealer and inflator composition stored in a sealed container to cause the pressure within the container at 130 degrees F. to be no more than about 170 psig, and preferably less than 160 psig. It is possible, with preferred members of the vapor pressure depressants of this invention, to reduce the container pressure to about 140–155 psig if desired, or to any of a range of pressures from about 140 psig up to about 160 psig or above, as desired, by reducing the amount of vapor pressure depressant or by adding other depressants as a mixture.

Preferably, the propellant/inflator used herein consists essentially of 1,1,1,2-tetrafluoroethane. If desired, 1,1,2,2,-tetrafluoroethane may be used, separately or in combination.

Preferably, the vapor pressure depressant used herein is a hydrocarbon diether of 3 to 4 carbon atoms. Specifically, such a vapor pressure depressant may be dimethoxymethane. Alternatively, the vapor pressure depressant may comprise the cyclic diether entitled 1,3-dioxolane, of the formula $C_3H_6O_2$. Other examples of noncyclic candidate hydrocarbon diethers used in this invention may include 1,2-dimethoxyethane; diethoxymethane, 1,2-diethoxyethane, methoxyethoxymethane, and 1,3,dimethoxypropane.

An example of the hydroxyketones of 3 to 6 carbon atoms comprises 4-hydroxy-4-methyl-2-pentanone. Other examples of materials of this class include methyl-2-hydroxyethylketone; hydroxyacetone; 2-hydroxypropyl methyl ketone, and di(2-hydroxyethyl)ketone.

The sealer and inflator composition of this invention may contain desired, conventional sealants such as are indicated in the previously cited patents, incorporated here by reference. The sealants may be water based or solvent based, containing in water based formulations particularly a known freeze point depressant such as a ethylene glycol and a known corrosion inhibitor such as sodium nitrite, sodium nitrate, ammonia, alkanolamine, or other compounds which are well known in the art.

Examples of suitable sealants include, but are not limited to, latex rubber emulsions, and acrylic or acrylate ester, terpene or wood resin formulations, wood resin ester formulations, and vinyl acetate copolymers. These may be carried as aqueous or nonaqueous emulsions or solutions.

Thus, known formulations and other formulations equivalent thereto for nonflammable, nonozone depleting tire sealer/inflator compositions may be modified to have a reduced vapor pressure below 180 psig through the action of the vapor pressure depressants of this invention, which act in an improved manner, frequently requiring less of a concentration of vapor pressure depressant to reduce the vapor pressure of the formulation to a desired level, with resulting cost saving.

The following examples, and the other disclosures of this application, are provided for illustrative purposes only, and are not intended to limit the scope of the invention of this application, which is as defined in the claims below.

EXAMPLE 1

A tire sealant composition was formulated as follows:

| Material | Percentage |
| --- | --- |
| Gold Eagle Water Based Adhesive (made by Dyna-Tech Adhesive Co. of Grafton, West Virginia described in U.S. | 10 Wt. % |

-continued

| Material | Percentage |
|---|---|
| Pat. No. 5,766,714) | |
| Ethylene Glycol | 5 Wt. % |
| Ammonium Hydroxide | 0.5 Wt. % |
| Sodium Nitrite | 0.96 Wt. % |
| Methylal (dimethoxymethane) | 25 Wt. % |
| Water | 58.54 Wt. % |

310 grams of the above sealant composition were placed into a conventional aerosol 2Q can, and approximately 208 grams of 1,1,1,2-tetrafluoroethane were added. The cans were crimped closed and placed into a temperature controlled bath at 130 degrees F. After an equilibration time of at least about one-half hour, the internal can pressure was measured and found to be 140 psig, which is 40 psig under the Department of Transportation limit of 180 psig for this type of aerosol can.

EXAMPLE 2

The experiment of Example 1 was repeated, with the sealant composition formula being as follows:

| Material | Percentage |
|---|---|
| Ucar Latex 174 (Union Carbide) | 10 Wt. % |
| Ethylene Glycol | 5 Wt. % |
| Ammonium Hydroxide | 0.5 Weight % |
| Sodium Nitrite | 0.5 Wt. % |
| Methylal (dimethoxymethane) | 20 Wt. % |
| Water | 64 Wt. % |

After temperature equilibration of the can at 130 degrees F., the pressure of the can was measured and found to be 142 psig.

EXAMPLE 3

The experiment of Example 1 was repeated using the following sealant composition:

| Material | Percentage |
|---|---|
| Ucar Latex 174 | 12 Wt. % |
| Ethylene Glycol | 5 Wt. % |
| Ammonium Hydroxide | 0.5 Wt. % |
| Sodium Nitrite | 0.5 Wt. % |
| 1,3-dioxolane ($C_3H_6O_2$) | 20 Wt. % |
| Water | 62 Wt. % |

After thermal equilibration of the contents in a sealed aerosol 2Q can at 130 degrees F., the pressure inside the can was measured to be 170 psig.

EXAMPLE 4

The experiment of Example 1 was repeated using the following tire inflator/sealant formulation:

| Material | Percentage |
|---|---|
| Ucar Latex 174 | 12 Wt. % |
| Ethylene Glycol | 5 Wt. % |
| Ammonium Hydroxide | 0.5 Wt. % |
| Sodium Nitrite | 0.5 Wt. % |
| Diacetone Alcohol (4-hydroxy-4- | 20 Wt. % |

-continued

| Material | Percentage |
|---|---|
| methyl-2-pentanone) | |
| Water | 62 Weight % |

After sealing of similar amount of this formulation into a 2Q-type aerosol can and thermal equilibration at 130 degrees F., the internal can pressure was measured at 174 psig.

Preferably, from 5 to 8 parts by weight of sealant composition (including the water or solvent carrier for the formulation); from 1 to 3 parts by weight of vapor pressure depressant; and 5 to 15 parts by weight of non-flammable propellant/inflator may be present in formulations in accordance with this invention, which are sealed in cans or other containers for use as a tire inflator.

What is claimed:

1. A sealer and inflator composition, comprising:
    a sealant;
    a non-flammable propellant/inflator having an ozone depletion potential of zero; and
    a vapor pressure depressant selected from the group consisting of hydrocarbon diethers of 3 to 6 carbon atoms and hydroxyketones of 3 to 6 carbon atoms, and mixtures thereof.

2. The composition of claim 1 in which said propellant/inflator comprises 1,1,1,2-tetrafluoroethane.

3. The combination of claim 2 in which said vapor pressure depressant comprises a noncyclic hydrocarbon diether of 3–4 carbon atoms.

4. The combination of claim 3 in which said vapor pressure depressant comprises dimethoxymethane.

5. The combination of claim 2 in which said vapor pressure depressant comprises the cyclic diether entitled 1,3-dioxolarte, of the formula $C_3H_6O_2$.

6. The combination of claim 2 in which said vapor pressure depressant comprises 4-hydroxy-4-methyl-2-pentanone.

7. The combination comprising: a sealant container which holds the sealer and inflator composition of claim 1, said container having a valved spout for delivery of said sealer and inflator composition.

8. The combination of claim 7 in which the pressure within said container at 130 degrees F. is no more than about 170 psig.

9. The combination of claim 8 in which said vapor pressure depressant comprises a hydrocarbon diether of 3–4 carbon atoms.

10. The combination of claim 9 in which said vapor pressure depressant comprises dimethoxymethane.

11. The combination of claim 9 in which said vapor pressure depressant comprises the cyclic diether entitled 1,3-dioxolane, of the formula $C_3H_6O_2$.

12. The combination of claim 8 in which said vapor pressure depressant comprises 4-hydroxy-4-methyl-2-pentanone.

13. The combination of claim 7 in which the pressure within said container at 130 degrees F. is less than 140–155 psig.

14. The combination of claim 13 in which said vapor pressure depressant comprises dimethoxymethane.

15. The composition of claim 2 in which the vapor pressure is 140–155 psig.

16. The composition of claim 15 in which said vapor pressure depressant comprises dimethoxymethane.

* * * * *